(12) United States Patent
Arora et al.

(10) Patent No.: US 7,630,957 B2
(45) Date of Patent: Dec. 8, 2009

(54) IMMUTABLE BOOKMARKS FOR LARGE OBJECTS IN A DATABASE

(75) Inventors: Geeta Arora, Union City, CA (US); Muralidhar Krishnaprasad, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 11/426,697

(22) Filed: Jun. 27, 2006

(65) Prior Publication Data

US 2007/0299816 A1    Dec. 27, 2007

(51) Int. Cl.
*G06F 7/00* (2006.01)
(52) U.S. Cl. .......................................................... 707/2
(58) Field of Classification Search ................ 707/2
See application file for complete search history.

(56) References Cited

U.S. PATENT DOCUMENTS 5,787,295 A * 7/1998 Nakao ........................ 715/210
6,658,437 B1 * 12/2003 Lehman ...................... 707/205
6,738,790 B1 * 5/2004 Klein et al. .................. 707/203
2005/0091287 A1 * 4/2005 Sedlar ......................... 707/200

OTHER PUBLICATIONS

"All XML Databases are Equal", http://www.idealliance.org/xtech/05/call/xmlpapers/02-06-01.16551/.02-06-01.html, May 2005.
"Working with Large Value Types", http://msdn2.microsoft.com/en-us/library/a1904w6t(d=printer.aspx, May 2005.

* cited by examiner

*Primary Examiner*—Charles Rones
*Assistant Examiner*—Fazlul Quader
(74) *Attorney, Agent, or Firm*—Aka Chan LLP

(57) ABSTRACT

User-level bookmarks are initially created at a specified offset in a large object (LOB) of a database and automatically updated to reflect a new offset, if necessary, after database updates. By logically linking the bookmark to a data element, the bookmark continues to point to the same logical data element as it did before the update. An API provides the functionality of immutable bookmarks by automatically changing the offset of the bookmark following sliding inserts or deletions of data to the database.

48 Claims, 6 Drawing Sheets

IMMUTABLE BOOKMARKS FOR LARGE OBJECTS IN A DATABASE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of Invention

Embodiments of the invention relate, in general, to database management. More specifically, embodiments of the invention relate to updating immutable bookmarks in a database.

2. Description of the Background Art

In relational databases, such as an Oracle relational database, certain data type codes are used internally by the database. One data type code is a large object or LOB, which may contain binary data comprising, by way of example, an image or a sound file. In other instances, the LOB may contain character data comprising an Extensible Markup Language (XML) document. LOBs are often stored in a database in multiple blocks of data, where each block is of database block size that may range from 2K to 32K in size. A LOB size can be as large as a few terabytes.

LOBs present unique handling problems because of their size. One such problem occurs when the LOB needs to be updated to add or delete data. Often, the update requires rewriting the entire LOB, which can span several database blocks depending on the size of the update. To avoid this time and resource consuming task, many relational database management systems merely append interim updates to a separate file and then from time to time perform a LOB reorganization to rewrite the LOB to remove any holes and obsolete data and to insert new additions.

As databases grow ever larger, a bookmark is a helpful user feature that enables a user to reach a specific location within the database quickly and with a minimum of effort. A bookmark is a marker that points to specified location in a designated LOB. When a user invokes the bookmark, the relational database management system returns the specified location.

To illustrate the concept of the bookmark, consider a database containing many LOBs each containing a book. Each LOB can range in size from a few bytes to a few terabytes, depending on the size of the book. A user may add a bookmark to the database so they can return to the start of a particular chapter or page without having to search the entire database for the starting location each time the user wants to access the starting location. Typically, because the type of data at the bookmarked location is not available to or known by the database management system, the bookmark is associated with a hard offset relative to the start of the LOB.

If an update to the LOB were to occur, such as if the preceding chapter were updated by adding (or deleting) a character or a page, the location of the bookmarked scene will start at a different offset. Unfortunately, when the LOB is reorganized, the bookmark offset is not translated to match the offset in the LOB where the particular chapter that was bookmarked by the user begins after the LOB is rewritten. Thus, after a database reorganization, it is common with prior database systems for a user to receive an incorrect offset since the bookmark is no longer correctly mapped to the desired content. Clearly, what is needed is a mechanism that will automatically calculate a new offset for the bookmark so that the user is able to correct access a bookmarked starting location after a database reorganization.

BRIEF SUMMARY OF THE INVENTION

Embodiments of the invention relate, in general, to database management. More specifically, embodiments of the invention relate to updating immutable bookmarks on LOBs or other datatypes in a database.

In accordance with an embodiment of the present invention, a user-level bookmark is created at a specified offset in a large object (LOB) of a database. When updates to the database occur, the bookmark offset is automatically changed during the database reorganization so that the bookmark points to the same logical data as it did before the update.

Rather than have the user keep track of the offset caused by a reorganization and manually update the offset for each of their existing bookmarks, the present invention enhances the functionality of the database by automatically changing the offset of the bookmark following an update to the database.

These and other features as well as advantages that categorize the present invention will be apparent from a reading of the following detailed description and review of the associated drawings.

DETAILED DESCRIPTION OF THE INVENTION

The present invention relates to relational databases and, more specifically, to automatic bookmark updates following an update to the database.

In the following description of embodiments of the present invention, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Further, in the following description of embodiments of the present invention, numerous specific details are presented to provide a complete understanding of the embodiments of the invention. One skilled in the relevant art will recognize, however, that the invention may be practiced without one or more of the specific details, or with other methods, components, etc. In other instances, well-known structures or operations are not shown or described in detail to avoid obscuring aspects of various embodiments of the invention.

Figure 1:
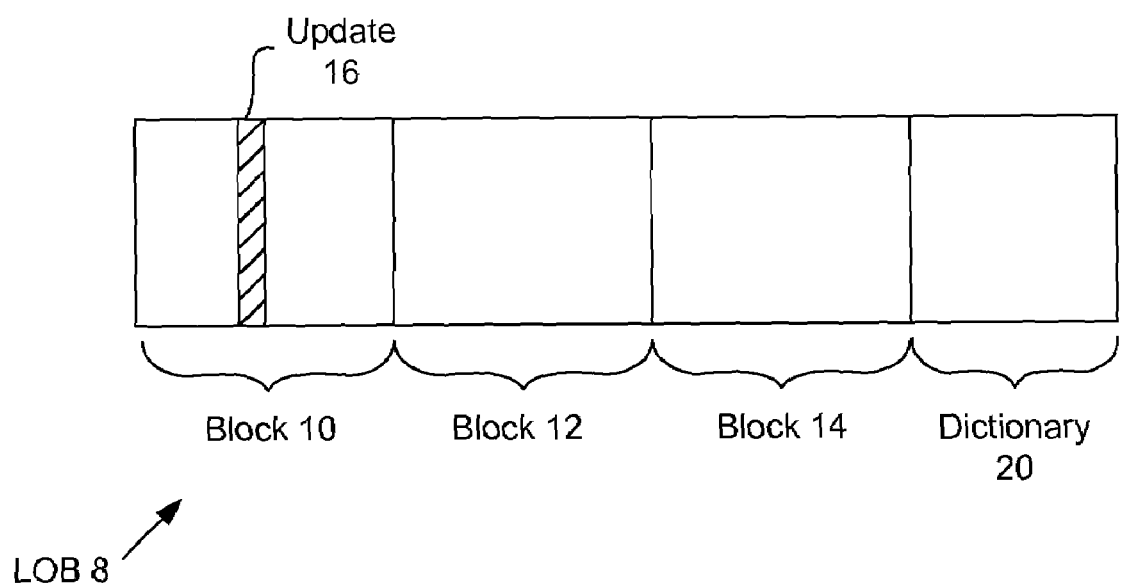
FIG. 1 illustrates an exemplary and simplified LOB datatype of a database structure in accordance with an embodiment of the present invention.

Refer now to FIG. 1, which illustrates an exemplary and simplified LOB datatype 8 spanning blocks 10-14. A typical database may contain many gigabytes of data and several thousands or even millions of such LOBs. Each LOB block 10-14 is allocated, in this embodiment, with about 32 kilobytes of storage space although as a practical matter a LOB block may be of any convenient block size. Further, although illustrated as a plurality of contiguous sequential LOB blocks, one skilled in the art will appreciate that sequential LOB blocks in a database may be stored in a noncontiguous manner in a storage device. Further, although the invention is described with reference to a LOB, one skilled in the art will appreciate that the present invention is equally applicable to CLOBs, BLOBs, large varchars or other datatypes. As used herein, CLOB refers to character large object which is a database field that holds a large amount of text or character data while BLOB (a synonym for LOB) refers to binary large object which is a database field that holds any digitized information, including text, images, audio or video. BLOBs and LOBs are often used interchangeably in the database industry.

When a LOB is updated with one or more bytes, such as illustrated at 16, the entire LOB is rewritten. This means that multiples blocks of 32 kilobytes are rewritten. To minimize the frequency of LOB rewrites, a dictionary 20 is appended to the end of a group of LOB blocks. An entry in the dictionary might read (in pseudo code) that at offset Y in LOB block 10, replace the current byte with the n bytes that follow. Each time an entry is added to the dictionary, a page in the dictionary LOB is rewritten.

When at least one of the LOB blocks becomes too fragmented for normal access, a LOB reorganization process rewrites the whole LOB spanning multiple blocks to remove holes and obsolete data and insert the new data. More specifically, when rewriting the LOB, the dictionary is read and the information in the dictionary is used to change the bytes of the LOB to reflect the updates. Typically, in prior art databases, bookmark update does not automatically occur during the LOB rewrite process. This means that a bookmark pointing to a certain data may no longer point to that data after the LOB rewriting process is complete.

To illustrate, if a LOB stores several chapters of a book, chapter 2 may initially be associated at an offset=1000 in the LOB. If the user bookmarks chapter 2, then the bookmark would point to the byte at offset 1000. When an update to chapter 1 causes the number of bytes in chapter 1 to change, then the start of chapter 2 is no longer associated with byte 1000. With the prior art, the bookmark still points to byte 1000 after the rewriting process is complete unless the user manually updates the bookmark to point to the correct location within the LOB.

Figure 2:
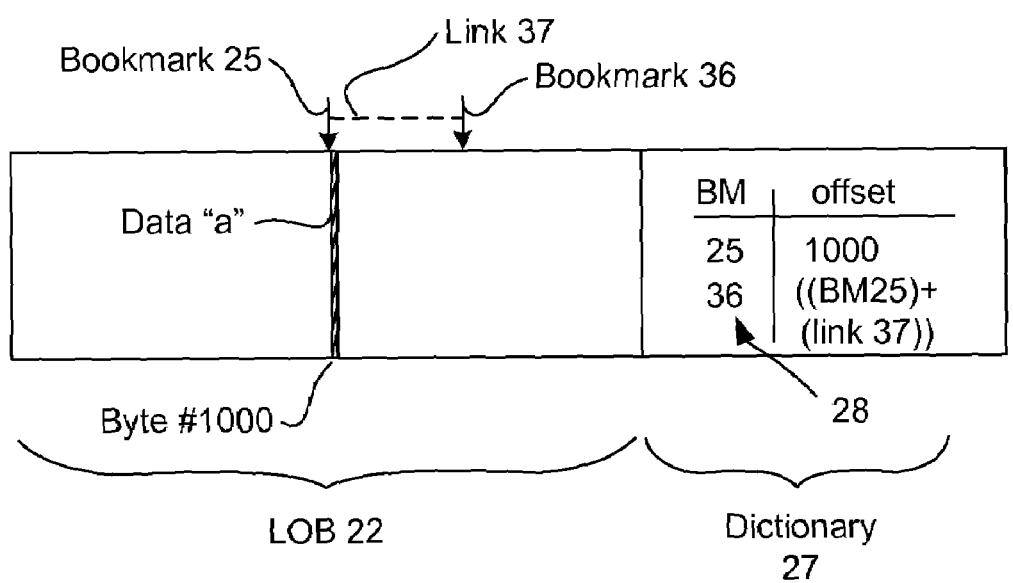
FIG. 2 illustrates a bookmark logically linked to user specified data in a database LOB in accordance with an embodiment of the present invention.

To further illustrate the update process, refer to FIG. 2 where a LOB 22 is shown prior to an update process. In this illustration, a bookmark 25 points to byte 1000 that corresponds to data "a." A bookmark dictionary 27, stored at the end of each LOB, maintains a list of bookmarks and a corresponding offset. Table 28 in dictionary 27 represents one embodiment for associating the offset with bookmark 25. More specifically, each bookmark is stored in the bookmark column of table 28 and an offset associated with the bookmark, if any, is stored in an offset column. Alternatively, a hash table may associate bookmarks with the appropriate offset.

When a reorganization occurs, such as where additional bytes are inserted (or deleted) into LOB 22 at a lower offset, then data "a" is no longer located at an offset of 1000. If the update caused the insertion into the LOB of, by way of example, five additional bytes, then data "a" would then be located at offset=1005. At this point of the update process, bookmark 25 still points to byte 1000 rather than to data "a."

To make bookmark 25 immutable, it is also necessary to adjust the bookmark to reflect the new offset where data "a" resides. While only one bookmark has been illustrated, it will be appreciated that the user may define a plurality of bookmarks each of which need to be adjusted to reflect the new offset. Advantageously, the present invention is scalable even for very large databases that may exceed several gigabytes and million of LOBs and contain large numbers of bookmarks.

Figure 3:
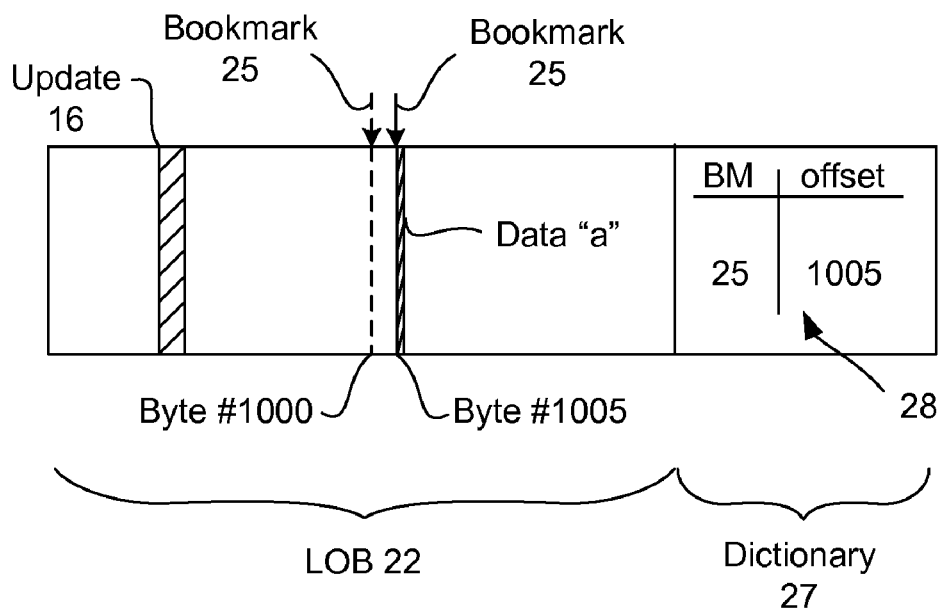
FIG. 3 illustrates a bookmark logically linked to user specified data in a database LOB after an update in accordance with an embodiment of the present invention.

Continuing with the illustration of the update process, refer now to FIG. 3 where an update to LOB 22 has resulted in the insertion of a block of data bytes 16. The original bookmark, now shown as a dashed arrow 25 at byte #1000, continues to point to the original offset. However, after the reorganization and the insertion of data bytes 16, the logical data to which bookmark 25 used to point has moved to byte #1005. Accordingly, bookmark 25, shown as a solid arrow 25, represents the updated position for bookmark 25 at byte #1005 and it now correctly points to the starting location for data "a." To the user, it appears as if the bookmark is immutable because it does not change relative to the data to which it points after an update. When LOB 22 is rewritten, bookmark dictionary 27 updates the offset associated with each bookmark in dictionary 27. Note that although only one bookmark is illustrated in bookmark dictionary 27, it is typical for many applications for bookmark dictionary 27 to contain updated offsets for a plurality of bookmarks.

In more general terms, if the initial offset for bookmark 25 is "p" bytes and the update overwrites "x" bytes of data with "y" bytes of data between the start of the LOB and the offset associated with the bookmark, the bookmark 25 will be adjusted from an offset of "p" bytes to an offset of (p−x+y) bytes. This offset equation ensures that the user's bookmarks will point to the same logical data before and after an update. Note that if x=0, then the update process is an insert of new data and if y=0, then the update process is a deletion of LOB data.

In another embodiment, an application program interface is provided to allow a user the opportunity to directly store a bookmark number and an offset into bookmark dictionary 27.

Figure 4:
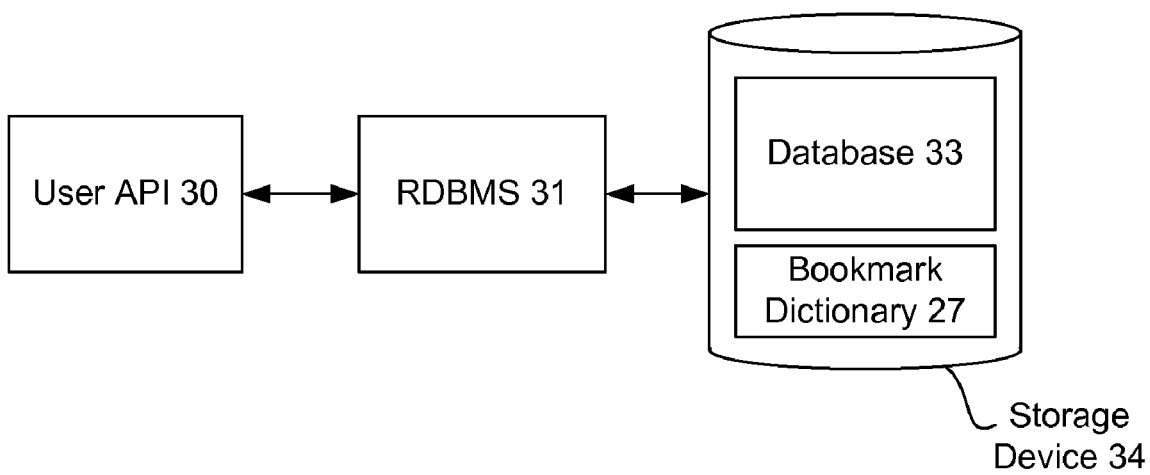
FIG. 4 illustrates a system for implementing immutable bookmarks in a database in accordance with an embodiment of the present invention.

FIG. 4 illustrates a system level view of the present invention. More specifically, a user API 30 accepts input from a user to specify the initial location of each bookmark. There is no practical limitation on the number of user-defined bookmarks although in one embodiment, API 30 implements a user restriction on the number of bookmarks allowed per LOB. For example, each user is limited to setting no more than n bookmarks per LOB, where n is an integer number greater than one. In a specific embodiment, n is greater than ten.

User API 30 is coupled to a relational database management server (RDBMS) 31 such that a user may easily identify a location in database 33 to associate with a bookmark. Server 31 may execute API 30 either directly or through a web interface. Alternatively, API 30 may be resident on a computing device (not shown) coupled to server 31. Database 33 includes a plurality of LOBs and is stored on storage device 34, which may be a storage area network or other large storage system. A bookmark dictionary 27 is also stored on storage device 34 either as a part of the LOB or, as illustrated, in a separate table that is not visible to the user. Whenever an update occurs to a LOB in database 33, a companion update to bookmark dictionary 27 reflects changes to the offset of the data to which the bookmark is logically linked.

Figure 5:
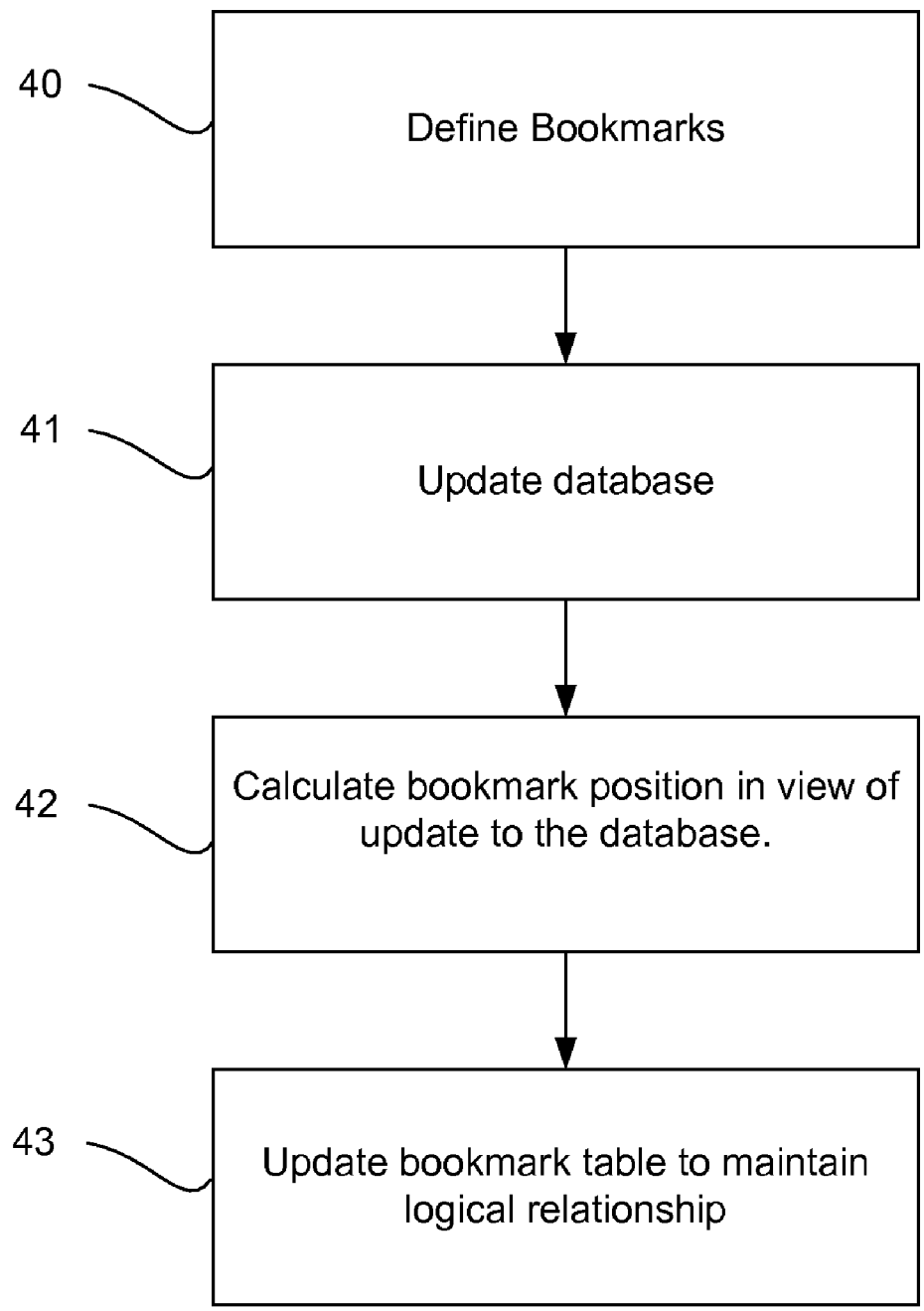
FIG. 5 is a flow diagram illustrating a method for logically linking a bookmark to user specified data in a database LOB in accordance with an embodiment of the present invention.
Figure 6:
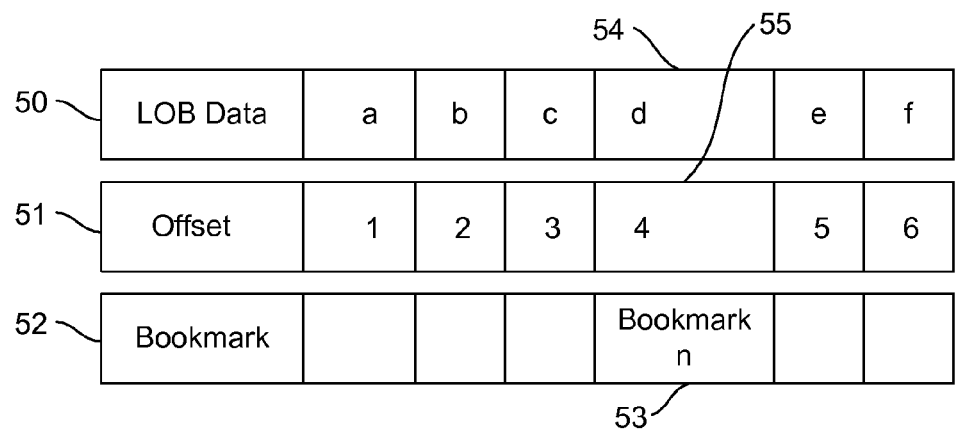
FIG. 6 is a conceptual illustration showing the relationship between a bookmark, user specified data, and the LOB offset before a database update in accordance with an embodiment of the present invention.

In one embodiment, API 30 comprises the following:
dbms_lob.createbookmark(locator IN, offset IN bookmark_num OUT);
dbms_lob.deletebookmark(bookmark_num IN);
dbms_lob.getoffset(bookmark_num IN, offset OUT);
dbms_lob.overwrite(locator IN, start_offset IN, src_amt IN, dst_amt IN, buffer IN);

The update process is described in accordance with an embodiment of the present invention in conjunction with FIGS. 5 and 6. In FIG. 5, a user defines one or more bookmarks at 40 such that each bookmark is associated with a logical piece of data and an offset that defines where the data is located in a database.

In FIG. 6, a representative database 50, offset table 51 and bookmark offset 52 are illustrated. Once a bookmark, such as bookmark n 53, is defined and logically associated with data "d" 54, it is also associated with a logical offset. Bookmark n 53 points to the location within the database that has an offset of "4" 55. The logical offset maintains the immutable relationship between the data and the bookmark after a database update.

Referring again to FIG. 5, after an update to the database, such as indicated at 41, data is either added or deleted to the database. At 42, API 30 calculates a new bookmark offset in view of the net addition or deletion to the database after the update. Thus, the offset of the data associated with the bookmark and the bookmark change in accordance with the formula (p−x+y) where p is the initial offset, in bytes, of the logical data associated with the bookmark, x is the number of bytes deleted from the database and y is the number of bytes added to the database between the start of the LOB and the offset associated with the bookmark. If x=0, then the update process is solely an insert of new data and if y=0, then the update process is solely a deletion of LOB data. The variables p, x, and y are all positive integers.

If the logical data to which the bookmark points is deleted during a reorganization, the corresponding bookmark is removed from table 28. To illustrate, consider the case where bookmark 25 points to the beginning of chapter 2 of an XML document at an offset of 1000. If chapter 2 is deleted in its entirety, bookmark 25 as well as the other bookmarks that point to chapter 2 will be deleted as well. More specifically, all bookmarks in the range beginning at offset 1000 to the end of the chapter are removed from table 28 during the reorganization. Advantageously, the logical association between each bookmark and the corresponding logical data makes it possible to delete the bookmarks when the corresponding logical data is deleted. Deleting the bookmarks simply requires removing the bookmark from table 28.

In another embodiment, it is possible to generate relative bookmarks that are related to immutable bookmark 25. For example, it is possible to define a bookmark In another embodiment of the present invention, relative bookmark 36, illustrated in FIG. 2, is defined in table 28 and associated by link 37 with a corresponding immutable bookmark 25. With relative bookmark 36, it is possible to add bookmarks that point to logical data at an offset relative to the immutable bookmark. By way of illustration, bookmark 36 may point to a page in an XML document that is n pages (defined by the link 37) from the beginning of the chapter associated with bookmark 25. The relative offset of bookmark 36 is calculated by adding the offset associated with bookmark 25 to the offset defined by link 37.

Figure 7:
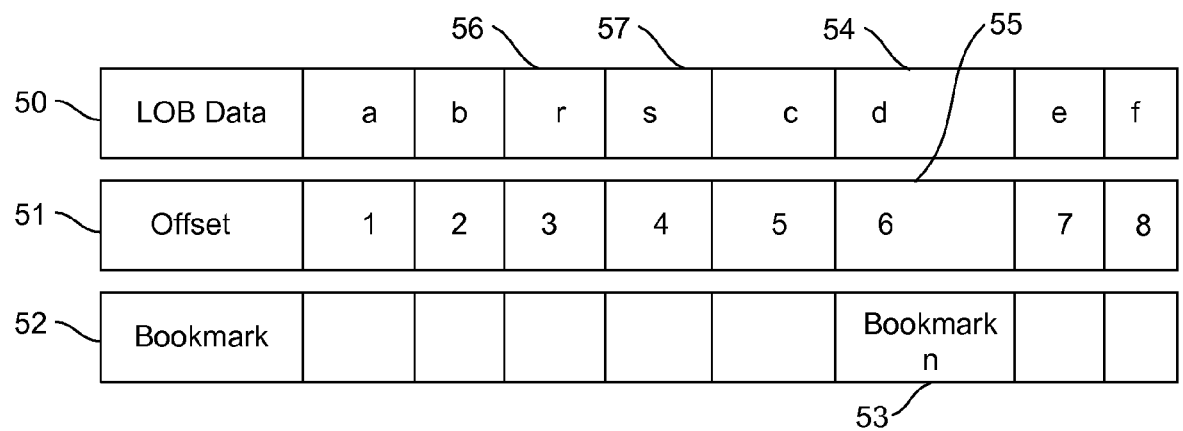
FIG. 7 is a conceptual illustration showing the relationship between a bookmark, user specified data, and the LOB offset after a database update in accordance with an embodiment of the present invention.

FIG. 7 illustrates the insertion of two data elements, r and s, at 56 and 57, respectively, into the database. In this instance, the appropriate offset, p, is changed to be (p−0+2), or (p+2). Thus, the offset 51 for data element "d" 54 and the offset 52 for bookmark n 53 are updated to reflect the insertion of new data elements 56 and 57. With the present invention, offset 52 is automatically changed whenever a reorganization of the database occurs.

Referring again to FIG. 5, once the correct offset is determined, the bookmark offset 52 in table 28 is updated to maintain the logical relationship with the data element 54.

Figure 8:
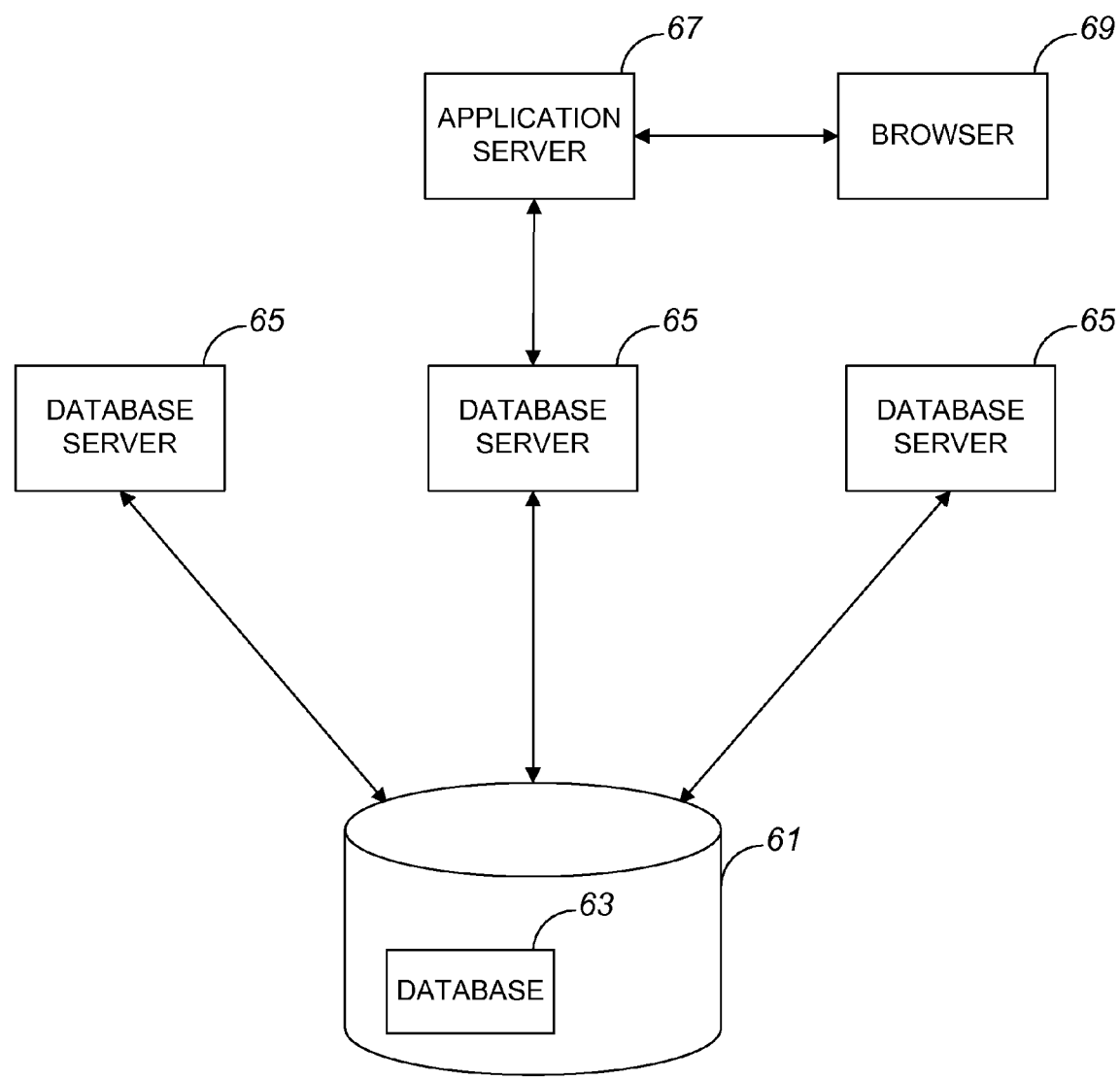
FIG. 8 is a block diagram representation of a database management system architecture that may be utilized in association with the embodiments of the present invention.

Embodiments of the present invention implement a user-level bookmark at specified offsets in database LOBs. When database reorganizations occur, the bookmark offset changes so that the bookmark points to the same logical data as it did before the reorganization. One suitable database management system architecture for implementing embodiments of the present invention is a three-tiered architecture that is illustrated in FIG. 8. At the core of a database management system is a central storage 61 that stores a database 63 or a repository. Central storage 61 may comprise a Storage Area Network (SAN), an array of magnetic or optical storage devices, a RAID storage array or other device or mechanism for storing computer data and instructions. Central storage 61 typically comprises one or more hard drives or other type of semiconductor, optical or magnetic storage, and is typically part of a larger computer system such as a server or a data warehouse comprising a plurality of servers and storage devices.

The information may be stored on database 63 in a variety of formats with relational database management systems relying heavily on tables to store the information. Information processing devices, such as database servers 65, are instances of a program that interacts with database 63. Each instance of a database server 65 may, among other features, independently query database 63 and store information therein.

In some instances, database servers 65 may not include user friendly interfaces, such as graphical user interfaces. Accordingly, at least one application server 67 may provide the user interfaces to database servers 65. By way of example, application server 67 may be a web application server on the Internet, or any other network. Application server 67 may provide user friendly mechanisms for accessing database 63 through database servers 65. A web browser 69 may be utilized to access application server 67. Thus, a user may select or place an immutable bookmark in database 63 by accessing application server 67 through web browser 69. When updates to the database occur, the bookmark offset is automatically changed so that the bookmark points to the same logical data as it did before the update.

Figure 9:
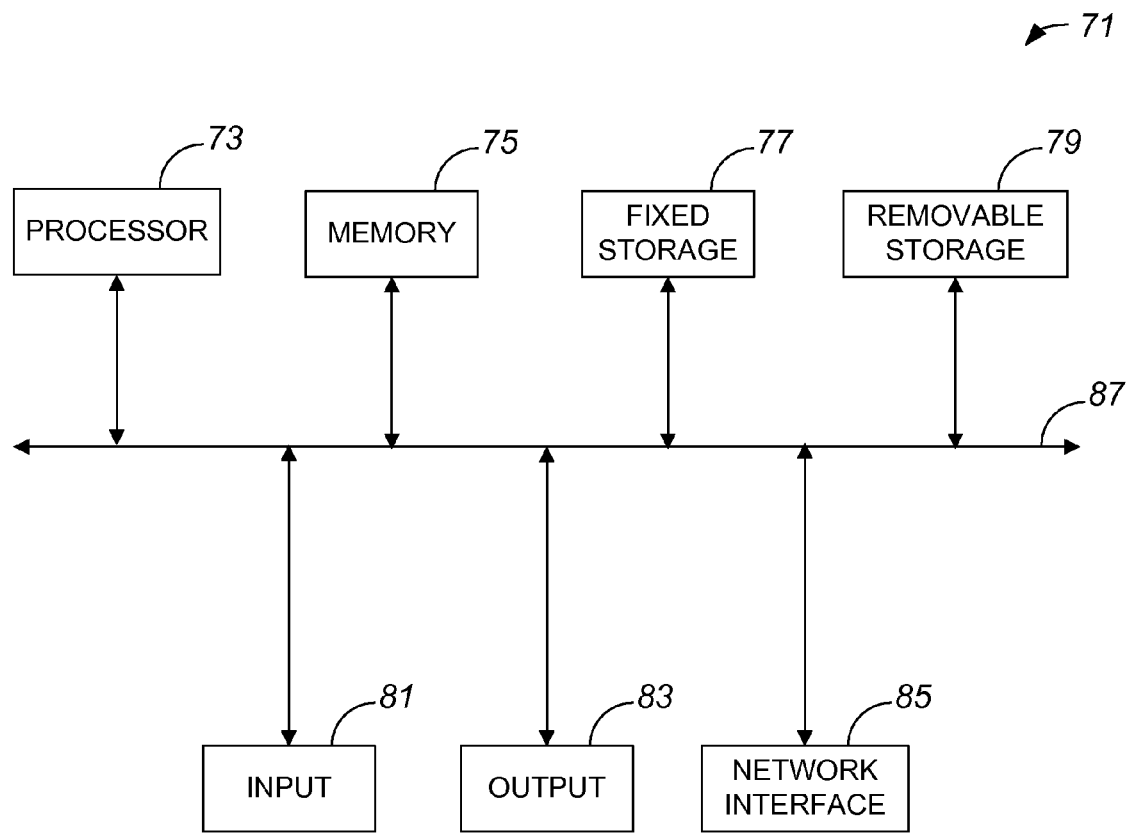
FIG. 9 is a block diagram representation of a computing system that may be utilized in association with the embodiments of the present invention.

FIG. 9 shows a block diagram of components that may be present in computer systems that implement embodiments of the invention. A computer system 71 includes a processor 73 that executes instructions from computer programs, including operating systems. Processor 73 may be utilized to allow a semantic engine, for example, to run. Although processor 73 typically has memory caches, processor 73 may utilize memory a 75, which may store instructions or computer code and data to implement embodiments of the present invention.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed.

A fixed storage 77 may store computer programs and data. Fixed storage 77 is typically persistent, and provides more storage than memory 75. One typical fixed storage 77 for databases comprises multiple hard drives, although it should be understood that fixed storage 77 maybe be any suitable component. A removable storage 79 provides mobility to computer programs and/or data that are stored thereon. Removable storage 79 may include, but is not limited to, mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

Memory 73, fixed storage 77 and removable storage 79 provide examples of computer readable storage media that may be utilized to store and retrieve computer programs incorporating computer codes or code devices that implement the invention, data for use with the invention, and the like. An input device 81 allows a user to interface with computer system 71. Input device 81 may be a keyboard, a mouse, buttons, dials, or any other suitable input mechanism. An output device 83 generally allows system 71 to provide output to the user. Output device 83 may include, but is not limited to, devices such as monitors, display screens, LEDs, printers, or substantially any other output mechanism.

Additional peripherals may be connected to the system through a network interface 85 or other interface such as serial, parallel, or universal serial bus (USB) interfaces.

Network interface 85 typically allows system 71 to interface with a network to which it is connected. The system bus architecture of computer system 71 is represented by arrows 87. The components shown in FIG. 9 may be found in many computer systems. However, components may be added, deleted, and combined without departing from the spirit or the scope of the present invention. For example, fixed storage 77 may be a file server that is accessed through a network connection. Thus, FIG. 9 is for illustration purposes and not limiting.

In one embodiment, a user utilizes computer system 71 to access database 63 and selects an immutable bookmark 53. Thereafter, bookmark 53 points the correct logical data element in database 63 even if there have been updates or changes to database 63. Database 63 may also include bookmark dictionary 27 although in other embodiments, bookmark dictionary 27 may be stored in a different database (not shown) or in different storage.

In another embodiment, computer system 71 is coupled to storage 61 and utilized to manipulate database 63 in response to user queries. In this embodiment, computer system 71 may update database 63 and calculate a new logical offset for bookmark 53 in response to the update. With the new logical offset, the immutable bookmark correctly points to the relative starting location for the data associated with the bookmark. Computer system 71 may, in some embodiments, store dictionary 20 and bookmark dictionary 27 in memory 73, fixed storage 77, or removable storage 79, or in database 62.

The present invention solves the problem of maintaining the logical relationship between a user bookmark and the data to which it relates even if the database is subsequently updated. The present invention solves the long felt need to logically link bookmarks with specific bytes in a database.

Although the present invention has been discussed with respect to specific embodiments thereof, these embodiments are merely illustrative, and not restrictive, of the present invention. For example, a "method for maintaining the logical relationship between a user bookmark and the data to which it relates even if the database is subsequently updated" can include additional, combined, altered, reordered or fewer method elements without departing from the spirit or the scope of the present invention. In other embodiments, the immutable bookmarks of the present invention can be used with a variety of datatypes, such as by way of example, large varchars, CLOBs, and BLOBs. Indeed, embodiments of the present invention are readily adaptable to a variety of datatypes and are particularly valuable for larger datatypes.

Any suitable programming language can be used to implement the routines of an embodiment of the present invention including C, C++, C#, Perl, Java, JavaScript, AJAX, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as standalone routines occupying a substantial part, or an in-substantial part of the system processing.

A computer-implemented version of the invention may be embodied using, or reside on, computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory or optical or magnetic disks. Volatile media includes static or dynamic memory, such as cache memory or RAM. Transmission media includes coaxial cables, copper wire, fiber optic lines, and wires arranged in a bus.

For example, a binary, machine-executable version, of the software of the present invention may be stored or reside in RAM or cache memory, or on mass storage device. The source code of the software of the present invention may also be stored or reside on mass storage device (e.g., hard disk, magnetic disk, tape, or CD-ROM). As a further example, code of the invention may be transmitted via wires, radio waves, or through a network such as the Internet.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. In a database that utilizes bookmarks to access user selected data stored in a database, a method for maintaining the association between the bookmarks and the user selected data comprising:
   associating a bookmark with an offset of the database;
   updating the offset associated with the bookmark to match an offset associated with the user selected data, wherein updating the offset associated with the bookmark comprises associating the offset with the bookmark in accordance with (p−x+y), where p denotes an initial offset, x denotes the number of deleted bytes, and y denotes the number of inserted bytes between a start of the user selected data and the initial offset associated with the bookmark;

reorganizing the database such that the user selected data is stored at the updated offset; and associating the bookmark with the updated offset.

2. The method of claim 1 further comprising automatically maintaining association between the bookmark and the updated offset whereby the bookmark is immutable when viewed.

3. The method of claim 1 wherein X is 0.

4. The method of claim 1 wherein updating the offset associated with the bookmark comprises updating an entry in a bookmark dictionary when reorganizing the database.

5. The method of claim 4 wherein updating the entry in the bookmark dictionary comprises updating a page in a LOB.

6. The method of claim 4 wherein updating the entry in the bookmark dictionary comprises updating a table not visible to a user.

7. The method of claim 1 wherein updating the offset associated with the bookmark comprises updating a hash table.

8. The method of claim 1 wherein Y is at least 1.

9. The method of claim 1 wherein user selected data stored in the database comprises a LOB.

10. The method of claim 9 further comprising updating the offset associated with the bookmark to match a binary offset associated with the user selected data in the LOB.

11. The method of claim 1 wherein user selected data stored in the database comprises a BLOB.

12. The method of claim 11 further comprising updating the offset associated with the bookmark to match a binary offset associated with the user selected data in the BLOB.

13. The method of claim 1 wherein user selected data stored in the database comprises a CLOB.

14. The method of claim 13 further comprising updating the offset associated with the bookmark to match the character offset associated with the user selected data.

15. The method of claim 1 wherein user selected data stored in the database comprises a large varchar.

16. The method of claim 1 further comprising defining a relative bookmark having an offset relative to the bookmark associated with the user selected data.

17. The method of claim 1 further comprising removing the bookmark when a range of data that includes the user selected data is deleted from the database.

18. In a relational database having a plurality of large datatypes and a plurality of bookmarks, each of which point to user selected data stored at a specific offset within the database, a system for updating at least one of the bookmarks in response to a database reorganization, the system comprising:

means for storing the database; means, coupled to the storing means and operating on a server, for managing the database; and an application program interface, coupled to the managing means, adapted to create a bookmark logically linked to user selected data stored in one of the plurality of large datatypes and to associate an offset of the database with the bookmark, wherein the application program interface further comprises means for changing the offset associated with the bookmark during database update in accordance with (p−x +y), where p denotes an initial offset. x denotes the number of deleted bytes, and y denotes the number of inserted bytes between a start of the user selected data and the initial offset associated with the bookmark.

19. The system of claim 18 wherein the application program interface further comprises means for automatically maintaining association between the bookmark and the undated offset whereby the bookmark is immutable when viewed.

20. The system of claim 18 wherein the application program interface further comprises means for calculating a new offset associated with the bookmark to maintain a logical linkage with user selected data after reorganization of the database.

21. The system of claim 20 wherein X is 0.

22. The system of claim 20 wherein Y is at least 1.

23. The system of claim 18 wherein the user selected data stored in the database comprises a LOB.

24. The system of claim 18 wherein the application program interface further comprises a hash table for changing the offset associated with the bookmark during database update.

25. The system of claim 18 wherein the application program interface further comprises a bookmark dictionary for maintaining the offset associated with the bookmark to maintain the logical linkage with the user selected data following update of the database.

26. The system of claim 18 wherein the application program interface further comprises a plurality of bookmark dictionaries for maintaining the offset associated with a plurality of bookmarks to maintain the logical linkage between each of the plurality of bookmarks with the user selected data during database update, each of said plurality of bookmark dictionaries associated with one of a plurality of LOBs.

27. A method for adding bookmarks to a relational database having a plurality of large objects (LOBs), the method comprising:

defining a bookmark by associating the bookmark at an initial offset in a LOB;

in response to a database reorganization, calculating an updated offset of the database for the bookmark; and updating the initial offset associated with the bookmark to reflect the updated offset, wherein updating the initial offset associated with the bookmark comprises associating the offset with the bookmark in accordance with (p −x +y), where p denotes the initial offset, x denotes the number of deleted bytes, and y denotes the number of inserted bytes between a start of the LOB and the initial offset associated with the bookmark.

28. The method of claim 27 further comprising logically linking the bookmark with user specified data.

29. The method of claim 28 wherein the user specified data comprises an Extensible Markup Language (XML) document.

30. The method of claim 27 wherein the bookmark is immutable.

31. A machine-readable medium including instructions executable by one or more processors, the machine-readable medium comprising:

one or more instructions for defining a bookmark by associating the bookmark at an initial offset in a database;

one or more instructions for calculating an updated offset for the bookmark; and one or more instructions for updating the initial offset associated with the bookmark to reflect the updated offset, wherein updating the initial offset associated with the bookmark comprises associating the initial offset with the bookmark in accordance with (p −x +y), where p denotes the initial offset. x denotes the number of deleted bytes, and y denotes the number of inserted bytes between a start of a LOB and the initial offset associated with the bookmark.

32. An information storage medium having a plurality of instructions adapted to direct an information processing device to perform a set of steps including:

defining an immutable bookmark by associating the bookmark with data stored at a location in a database; updating the database such that the data is stored at an updated location in the database; and associating the bookmark with the updated location, wherein associating the bookmark with the undated location comprises associating an initial offset with the bookmark in accordance with (p −x +y), where p denotes the initial offset, x denotes the number of deleted bytes, and y denotes the number of inserted bytes between a start of the data stored and the initial offset associated with the bookmark.

33. The information storage medium of claim 32, wherein the bookmark association comprises associating the bookmark with an offset in a large object (LOB).

34. The information storage medium of claim 32, wherein the bookmark association comprises associating the bookmark with an offset in a character large object (CLOB).

35. The information storage medium of claim 32 having a plurality of instructions further adapted to updating the offset associated with the bookmark, said adapting comprising updating an entry in a bookmark dictionary.

36. A method comprising:

permitting access to a first data stored in a database by using a first bookmark, where the first bookmark is linked to the first data through a first offset value relative to a reference position in the database;

reorganizing the database so that the first data moves to a second offset value relative to the reference position; and after the reorganizing the database, updating the first bookmark to associate with the second offset value instead of the first offset value, wherein updating the first bookmark comprises associating the second offset with the first bookmark in accordance with (p −x +y). where p denotes the first offset, x denotes the number of deleted bytes, and y denotes the number of inserted bytes between a start of the first data and the first offset associated with the first bookmark.

37. The method of claim 36 comprising:

storing the first bookmark in a bookmark dictionary of the database, wherein the bookmark dictionary comprises an entry having a bookmark identifier and an associated offset value; and after the reorganizing the database, updating each entry of the bookmark dictionary.

38. The method of claim 36 wherein X is 0.

39. The method of claim 36 wherein Y is at least 1.

40. The method of claim 37 wherein the bookmark dictionary is stored in the database.

41. The method of claim 36 wherein the first data is positioned in the database relative to the reference position at the first offset value.

42. The method of claim 36 wherein the reorganizing the database comprises inserting a second data into the database between the reference position and the first offset value, and after the inserting a second data, the second offset value is larger than the first offset value.

43. The method of claim 36 wherein the reorganizing the database comprises inserting a second data into the database after reference position and the first offset value, and after the inserting a second data, the second offset value is the same as the first offset value.

44. The method of claim 36 wherein the reorganizing the database comprises removing a second data from the database that is between the reference position and the first offset value, and after the removing a second data, the second offset value is smaller than the first offset value.

45. The method of claim 36 wherein the reorganizing the database comprises removing a second data from the database that is after the reference position and the first offset value, and after the removing a second data, the second offset value is the same as the first offset value.

46. The method of claim 36 wherein the database is a relational database on a file server, the first data comprises position in a large object of the database, the reorganizing the database comprises recording the changes to the large object in a large object dictionary and the method further comprises:

after the recording the changes to the large object, rewriting the large object to include the changes recorded in the large object dictionary, wherein the updating the first bookmark occurs after the rewriting the large object.

47. The method of claim 46 wherein when the first data is deleted from the large object, deleting the first bookmark before the rewriting the large object.

48. The method of claim 46 wherein the recording the changes to the large object comprises an insertion of second data into the large object, and the method further comprises:

before the rewriting the large object, permitting access to the second data by using a second bookmark, wherein the second bookmark is linked to the second data through a third offset value relative to the reference position in the database.

* * * * *

UNITED STATES PATENT AND TRADEMARK OFFICE
CERTIFICATE OF CORRECTION

PATENT NO.        : 7,630,957 B2                                           Page 1 of 1
APPLICATION NO.   : 11/426697
DATED             : December 8, 2009
INVENTOR(S)       : Geeta Arora et al.

It is certified that error appears in the above-identified patent and that said Letters Patent is hereby corrected as shown below:

In column 5, line 13, delete "IN" and insert -- IN, --, therefor.

In column 5, line 63, delete "bookmark" and insert -- bookmark. --, therefor.

In column 9, line 67, in claim 18, delete "offset." and insert -- offset, --, therefor.

In column 10, line 7, in claim 19, delete "undated" and insert -- updated --, therefor.

In column 10, line 67, in claim 31, delete "offset." and insert -- offset, --, therefor.

In column 11, line 12, in claim 32, delete "undated" and insert -- updated --, therefor.

In column 11, line 42, in claim 36, delete "(p-x+y)." and insert -- (p-x+y), --, therefor.

Signed and Sealed this

Fourteenth Day of September, 2010

David J. Kappos
*Director of the United States Patent and Trademark Office*